United States Patent
Guo et al.

(10) Patent No.: US 11,712,677 B2
(45) Date of Patent: Aug. 1, 2023

(54) ZEOLITE PARTICLES, SYSTEMS FOR USING SAME AND METHODS OF USE IN DESICCATION

(71) Applicants: The Regents of the University of California, Oakland, CA (US); Colorado State University Research Foundation, Fort Collins, CO (US)

(72) Inventors: Ting Guo, Davis, CA (US); Davide Donadio, Davis, CA (US); Jason Quinn, Fort Collins, CO (US); Casey Quinn, Fort Collins, CA (US)

(73) Assignees: The Regents of the University of California, Oakland, CA (US); Colorado State University Research Foundation, Fort Collins, CO (US)

( * ) Notice: Subject to any disclaimer, the term of this patent is extended or adjusted under 35 U.S.C. 154(b) by 348 days.

(21) Appl. No.: 15/929,804

(22) Filed: May 22, 2020

(65) Prior Publication Data
US 2020/0368718 A1    Nov. 26, 2020

Related U.S. Application Data

(60) Provisional application No. 62/851,305, filed on May 22, 2019.

(51) Int. Cl.
*B01D 53/26* (2006.01)
*B01J 20/18* (2006.01)
(Continued)

(52) U.S. Cl.
CPC .......... *B01J 20/18* (2013.01); *B01D 53/0423* (2013.01); *B01D 53/261* (2013.01); *B01D 53/28* (2013.01);
(Continued)

(58) Field of Classification Search
CPC .... B01D 53/02; B01D 53/04; B01D 53/0423; B01D 53/261; B01D 53/28;
(Continued)

(56) References Cited

U.S. PATENT DOCUMENTS 2,548,168 A * 4/1951 Luce ...................... B65D 51/30
                                                    426/87
2,882,243 A    4/1959 Milton
(Continued)

OTHER PUBLICATIONS

Flanigen et al., "Zeolites in Industrial Separation and Catalysis" ISBN: 978-3-527-32505-4, 26 pages, date unknown.
(Continued)

*Primary Examiner* — Frank M Lawrence, Jr.
(74) *Attorney, Agent, or Firm* — McKee, Voorhees & Sease, PLC

(57) ABSTRACT

Methods, compositions, systems and devices are provided in which zeolite particles, preferably of silicon and aluminum, are used as desiccants. In embodiments a plurality of zeolite particles are provided that are less than 1 mm in size. The particles may be arrayed such that at least some of the plurality of particles are spaced apart from each other and may be arrayed in rows and columns. Embodiments provide the particles are useful or removing water under ambient conditions and in removing water from air or material and in an embodiment removing water from plant material, such as harvested crop material, or where the dried air is contacted with plant material. Microwave radiation may be used to efficiently and in a cost effective manner dehydrate the rehydrated particles.

10 Claims, 15 Drawing Sheets

(51) Int. Cl.
*B01J 20/28* (2006.01)
*B01J 20/34* (2006.01)
*B01D 53/28* (2006.01)
*B01D 53/04* (2006.01)
*F26B 5/16* (2006.01)

(52) U.S. Cl.
CPC ... *B01J 20/28004* (2013.01); *B01J 20/28016* (2013.01); *B01J 20/28052* (2013.01); *B01J 20/3408* (2013.01); *B01J 20/3441* (2013.01); *F26B 5/16* (2013.01); *B01D 2253/1085* (2013.01); *B01D 2253/304* (2013.01); *B01D 2257/80* (2013.01); *B01D 2259/40094* (2013.01)

(58) Field of Classification Search
CPC ...... B01D 2253/1085; B01D 2253/304; B01D 2257/80; B01D 2259/40094; B01J 20/18; B01J 20/28004; B01J 20/28016; B01J 20/28052; B01J 20/3408; B01J 20/3441; B01J 20/28033; F26B 3/347; F26B 5/16
USPC .............. 95/117, 121, 126; 34/80, 472, 473; 423/700; 502/400
See application file for complete search history.

(56) References Cited

U.S. PATENT DOCUMENTS

| | | | | |
|---|---|---|---|---|
| 3,024,867 | A * | 3/1962 | Milton | B01D 53/04 95/124 |
| 3,130,007 | A | 4/1964 | Brock | |
| 3,531,916 | A * | 10/1970 | Robert | B01D 53/04 95/124 |
| 4,312,641 | A * | 1/1982 | Verrando | B01J 20/20 95/122 |
| 5,191,721 | A * | 3/1993 | Incorvia | F26B 21/083 34/259 |
| 5,371,762 | A * | 12/1994 | Amrany | H04N 5/211 348/614 |
| 6,296,823 | B1 * | 10/2001 | Ertl | F24F 8/10 95/143 |
| 2004/0040173 | A1 * | 3/2004 | Kruithof | F26B 5/16 34/354 |
| 2006/0010713 | A1 * | 1/2006 | Bussmann | A23L 5/273 34/473 |
| 2011/0259828 | A1 * | 10/2011 | Bouvier | B01D 53/02 585/824 |
| 2013/0266785 | A1 * | 10/2013 | Chen | B01J 20/28064 252/194 |
| 2017/0368491 | A1 * | 12/2017 | Cueman | B01D 46/0028 |
| 2018/0001250 | A1 * | 1/2018 | Lee | B01D 53/261 |
| 2020/0298178 | A1 * | 9/2020 | Cuesta | B01D 53/28 |
| 2021/0252427 | A1 * | 8/2021 | Traut | B01D 17/0202 |
| 2021/0362128 | A1 * | 11/2021 | Jasuja | B01J 20/3204 |

OTHER PUBLICATIONS

Guo et al. "Zeolite regeneration for commercial crop/food drying" Poster presentation Innovator Summit May 21-22, 2019, Innovation Institute for Food and Health (IIFH), University of California—Davis CA.

Hurburgh, Jr., Charles R., "Soybean Drying and Storage", Iowa State University, University Extension, File: Engineering 2, 2 pages, published Nov. 2008.

Sadaka et al., "On-Farm Corn Drying and Storage", Arkansas Corn Production Handbook, Chapter 10, 8 pages, updated Nov. 2014.

Cantwell, Marita, "Estimates of Shelf-life of Raw Nuts Held at Different Temperatures", 6 pages, Summary prepared at University of California, Davis on Jun. 24, 2014.

http://www.iza-structure.org/databases/, accessed on Jul. 14, 2020.

* cited by examiner

ZEOLITE PARTICLES, SYSTEMS FOR USING SAME AND METHODS OF USE IN DESICCATION

REFERENCE TO RELATED APPLICATIONS

This application claims priority to previously filed and application U.S. Ser. No. 62/851,305 filed May 22, 2019, the contents of which are incorporated herein by reference in their entirety.

SUMMARY

Provided here are methods, compositions and systems and devices that utilize a plurality of zeolite particles for desiccation. In embodiments the particles comprise silicon and aluminum and in other embodiments are arrayed in a pattern such that at least a portion of the plurality of particles do not touch each other and in further embodiments may be arrayed in rows or columns. Other embodiments provide the particles are 1 mm or less in size, and may be about 0.5 µm to 50 µm in size and other embodiments provide the particles are about 100-400 nm in size. Still further embodiments provide the particles can be used at ambient temperatures. Embodiments provide water may be removed from the particles using microwave radiation. Increased efficiency in drying, decreased costs and improved energy savings are provided. The methods provides for drying air (which dried air may optionally be contacted with material to be dried) or may be used to dry materials. In embodiments the particles are useful in drying plant material, such as field crops, after harvesting and reducing costs, improving energy savings in reducing plant moisture. Systems and devices for same are also provided. The method can also dry pharmaceuticals such as proteins and antibodies, especially those have to be dried at relatively low temperatures or close to room temperature. Fruits containing vitamin C or other nutrients that cannot endure high temperatures such as tomatoes or kiwi are also suitable for embodiment described here.

BRIEF DESCRIPTION OF THE DRAWINGS

FIG. 14A is at T=360K and FIG. 14B is at T=440K. The results suggest that energized water passes its energy to the zeolite host within picoseconds.

DESCRIPTION

Figure 1:
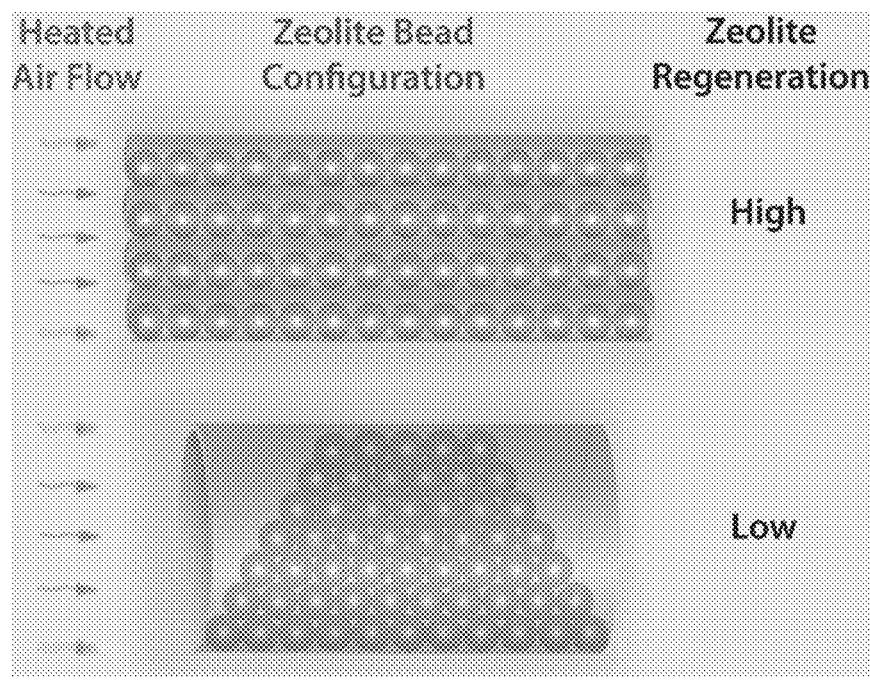
FIG. 1 is a graphic depicting two zeolite particle configurations.

Methods, compositions and systems are provided here in which zeolite particles are used in an improved manner to increase drying efficiency, to provide drying of material exposed to the zeolites that occurs in a shorter period of time, with less energy expended, at lower cost and at ambient temperatures, to improve use as a desiccant.

In an embodiment zeolite particles are produced that are less than 1 mm in length and diameter and in further embodiments at about 0.1 µm to 100 µm and in an embodiment can be 0.5 µm to 50 µm in size. Yet further embodiments provide particle sizes may be 100-400 nm.

The present methods and compositions relate to use of zeolites arranged in an array as opposed to a collection of zeolites that is not arranged in an order. In an embodiment of the methods, a plurality of zeolites are provided that are ordered such that there are discreet spaces between the zeolites. The zeolites may be ordered in a horizontal or vertical pattern, in a circle, square, rectangle or any other type of pattern in which at least some of a plurality of zeolite particles are not touching each other, or, may touch at one portion of the particle but provide that at least a portion of the particle does not touch another particle. In embodiments the upper and/or lower portion of the particle does not touch another particle. In further embodiments, one or both sides of the particle will not touch another particle. Embodiments provide the particles may be arrayed in rows and columns. Increased efficiency in desiccant action of the zeolites and also in regenerating/drying hydrated zeolites is provided with such an arrangement. To provide for the appropriate spacing of the particles, in an embodiment the particles may be arranged on a surface. The composition of the surface or support is not critical, as long as the particles may be maintained in their spaced arrangement. For example, the surface may be porous, non-porous, composed of fiber, glass, metal, plastic, polymers, cellulose fibers, or any convenient surface that allows for such spacing of the particles without taking up water themselves.

The present methods, compositions and systems can be used at temperatures of less than about 400° F., at temperatures of less than about 212° F., at temperatures of less than about 113° F., less than 110° F., less than 100° F. and remove moisture quickly as shown below. Embodiments provide the particles remove moisture efficiently at ambient temperatures, and remove moisture at least as efficiently as larger particles exposed to higher temperatures. Thus rather than heating to high temperature not found at ambient conditions, it is possible to allow the removal of water at the condition of the environment. This is especially useful when removing moisture from plant material, fruits, and temperature sensitive pharmaceuticals. Use of zeolite particles as described can remove moisture at conditions of less of about 77° F. or less and in an embodiment at or near room temperature, which in an embodiment is about 68° F. to 77° F. Spray drying at 60 degrees Celsius of commodities indicates drying occurring at one or more seconds and would also occur up to one minute (or more).

Further, microwave radiation enhances drying of the zeolite particles so that they can be dehydrated and reused. Embodiments provide the exposure to microwave radiation can be less than 30 seconds, can be at least 30 seconds, one minute, two minutes, three minutes, four minutes, five minutes, six minutes, seven minutes, eight minutes, nine minutes, ten minutes, 15 minutes, 20 minutes, 25 minutes, 30 minutes, 35 minutes, 40 minutes, 45 minutes, 50 minutes or more or amounts in-between. The use of zeolites with microwave radiation can produce at least one fold, two fold, three fold, four fold, five fold, six fold, seven fold, eight fold, nine fold, 10 fold, 15 fold, 20 fold, 30 fold or more reduction in energy used compared to the system not employing microwave radiation. Such savings in energy reduce costs and can be measured, for example, in cost of energy required to achieve reduction in water content compared to using conventional hot air dryers. Electromagnetic waves with a wavelength in the range of about one meter to one millimeter and frequencies between about 300 MHz and 300 GHz are utilized in an embodiment. Energy savings is in embodiments 5%, 6%, 7%, 8%, 9%, 10%, 15%, 20%, 25%, 30%, 35%, 40%, 45%, 50%, 55%, 60% or more or amounts in-between.

An embodiment provides a plurality of zeolite particles are exposed to the microwave in a chamber which contains the targeted materials or in another chamber in which zeolites can be dried using microwaves. Further, Multiple zeolite packages can be used so that drying can be done continuously while these zeolite packages can be dried and reused to support continuous drying.

In embodiments the methods and compositions and systems may be used to improve drying time and energy savings and lower costs when drying plants, especially crop plants.

Zeolites refer to any of a large group of microporous minerals consisting of hydrated aluminosilicates of sodium, and alkali metals such as potassium, calcium, and barium. They can be readily dehydrated and rehydrated, and are used as cation exchangers and molecular sieves. They can be used as commercial absorbents and catalysts. Silicon or aluminum ions are surrounded by four oxygen ions in a tetrahedral configuration with each oxygen bonded to two adjacent silicon or aluminum ions. The open tetrahedral framework that provides for 20 to 50% of the volume as void allows ion exchange and reversible dehydration. There may be higher or lower amounts of silicon or aluminum in a particular zeolite. The structure can be in the form of rings or polyhedral and cavities formed typically have diameters from about two to eight angstroms. As a result, water and ions move between the cavities to allow for reversible dehydration. The rate of water movement in zeolites depends on the temperature of zeolites. Zeolites are also used frequently in water softeners to remove calcium ions and releasing sodium ions into the water. In general they can be represented by the formula:

$$M_{2/n}O \cdot Al_2O_3 \cdot \gamma SiO_2 \cdot wH_2O$$

where $\gamma$ is 2-200, n is the cation valence and w represents the water contained in the voids of the zeolite. When referring to zeolite is meant such structures and the cationic forms it takes.

Zeolites may be formed naturally or produced synthetically. Commercially useful natural zeolites include mordenite, chabazite, erionite and clinoptilolite. Synthetic zeolites are produced to be of a uniform specified size, typically from about 1 μm to 1 mm for a particular use. Zeolites commercially can be found used in odor control and pet litter by trapping the undesired liquid or air molecules. Other examples of such uses are in removing radioactive nuclear waste and toxic heavy metals from soils. By way of example, after the Fukushima nuclear disaster in 2011, zeolites were used to trap radioactive substances in the soil.

Synthetic zeolites include different cationic forms such as type A, Y, X, CaBaX, or LSX zeolites. Pore openings can be used to selectively adsorb molecules smaller than the pore size and not larger molecules. Zeolite A tetrahedra are cross-linked by the sharing of oxygen atoms such that the ratio of oxygen atoms to total aluminum and silicon atoms is equal to two or $O(Al+Si)=2$, as described at U.S. Pat. No. 2,882,243, incorporated herein by reference in its entirety. Type A zeolites with 4 to 8 mesh sieves are commonly utilized in gas and solvent drying where Type X zeolites of 8 to 12 mesh size are often used in liquid phase applications. Zeolites X and Y form a series of structures which are isostructural with the rare natural mineral faujasite (FAU). They have a basic formula of $(Ca, Mg, Na_2)_{29}(H_2O)_{240}$ $|[Al_{58}Si_{134} O_{384}]$—FAU. Zeolite Y differs only in a higher silicon/aluminum ratio (of about 1-1.5). Type Y is used frequently in catalytic cracking. These are similar to zeolite A but with the β-cages joined via half of their six-rings to create a diamond-like array. An example of publications that are frequently updated that described such variants is the Atlas of Zeolite Frameworks, formerly known as the Atlas of Zeolite Structure Types (Baerlocher et al. $6^{th}$ Ed. 2007 Elsevier Science). FAU is used, for example, under this system for zeolites with faujastiote topology such as zeolites X and Y, LTA for Linde zeolite A. The updated searchable database can be found at iza-structure.org/databases/.

There are a wide variety of means to produce synthetic zeolites, many of which have been known for some time. By way of example without limitation, one method uses a mixture of sodium, aluminum and silica with steam to create a gel that is aged, heated to about 194° F. Yet another example uses clay heated until it melts, is then chilled and ground to a powder followed by mixing with sodium salts and water. This is then aged and heated. By way of example, without intending to be limiting, crystalline zeolite Y and methods of producing it are discussed at U.S. Pat. No. 3,130,007, incorporated herein by reference in its entirety. Yet another example is found at U.S. Pat. No. 2,882,243.

Zeolites have been used in a wide variety of applications including in petroleum refining, production of organic chemicals, as detergents, in ion exchange projects and recovery of toxic and volatile organic compounds, among others. In the present application the methods and compositions are particularly useful as desiccants.

There are a variety of materials that can be used as desiccants in absorbing moisture from an environment. One example of a naturally occurring substance is montmorillonite clay, which is dried for repeated absorption of water, but which may be released as temperatures increase. Silica gel is partially dehydrated polymeric colloidal silicic acid. The interconnected pores hold water by adsorption and capillary condensation. Again, it tends to release water as temperatures rise to room temperature such as 77° F. or higher. Zeolites here can be employed in reversible hydration-dehydration systems and can be used in any application in which such a system may be useful. By way of example without limitation, such drying agents can be used in packaging to reduce humidity in a storage container, whether a canister, box, card, bottle or any type of container or between panes of glass to reduce moisture condensation. Zeolite beads have been used to dry industrial feedstock gases such as hydrogen and oxygen, to dry liquid propane gas and natural gas, drying alcohols and benzene where water molecules are sieved by the zeolite.

The compositions of the present efforts and methods may be used in any system in which adsorption of moisture is desired. The materials and systems may be utilized to dry any material desired which has water or any material desired that has water. Embodiments provide the air after drying by the zeolite particles may then be used to dry materials (such as plant material, as described below). The system and methods are not limited to any particular materials and may be useful, for example without intending to be limiting, in drying protein compositions (examples include drying enzymes or whey); compositions comprising antibodies (such as IgG), therapeutic and pharmaceutical compositions (such as insulin, vaccines, erythropoietin); devices such as electronics; plants, as described below, including fruit; chemical compositions, or the like. The systems and methods may be useful especially in producing powders.

In a preferred embodiment, the methods and compositions are useful in drying plants, such as crop plants. The plant materials may be dried with the zeolites, or air dried with the zeolites and air passed over the plant materials. Drying crops to reach safe moisture levels for long term storage can be a costly input for producers. For example, corn is recommended to be dried to at least 15.5% moisture content if to be marketed immediately, and for longer storage should be dried to 12.0% moisture content. Examples of methods used include moving large volumes of low humidity air over the kernels, adjusting humidity and velocity of the air flow. Unheated natural air may be passed through the grain, the air may be heated to about 10° F. above ambient conditions, in layered or batch drying or continuous flow drying. See, e.g., Sadaka et al. Arkansas Corn Production Handbook, Ch. 10 U of Arkansas; at uaex.edu/publications/pdf/mp437/chapter10corn.pdf. Soybean moisture content for winter storage is 13% or less, 12% or less for up to one year and 11% or less for more than one year. extension.iastate.edu/grain/files/Migrated/soybeandryingandstorage.pdf. Long term storage of wheat typically requires about 12-13% moisture content. Moisture content of tree nuts is recommended to be lower, commonly 8% or less as recommended by the FDA to avoid fungal growth. For example, the moisture content of common nuts in refrigerated storage should be near the following percentages: almonds 6%, Brazil nuts 7%, cashew nuts 8%, coconut 20%, hazelnuts 15%, macadamia nuts 15%, pecans 5%, peanuts 7%, pistachio nuts 7% and walnuts 5%. See UC Davis (2014) "Estimates of Shelf-life of Raw Nuts Held at Different Temperatures" athttps://ucanr.edu/datastoreFiles/234-2753.pdf.

The present methods and compositions may be used with any plant, and may be found to be most useful with plants that need to be dried after harvesting. Example species include monocotyledonous or dicotyledonous plants, including but not limited to corn (*Zea mays*), canola (*Brassica napus, Brassica rapa* ssp.), alfalfa (*Medicago sativa*), rice (*Oryza sativa*), rye (*Secale cereale*), sorghum (*Sorghum bicolor, Sorghum vulgare*), sunflower (*Helianthus annuus*), wheat (*Triticum aestivum*), soybean (*Glycine max*), tobacco (*Nicotiana tabacum*), potato (*Solanum tuberosum*), peanuts (*Arachis hypogaea*), cotton (*Gossypium hirsutum*), sweet potato (*Ipomoea batatus*), cassava (*Manihot esculenta*), coffee (*Cofea* spp.), coconut (*Cocos nucifera*), pineapple (*Ananas comosus*), strawberry (*Fragaria×ananassa*), citrus trees (*Citrus* spp.), cocoa (*Theobroma cacao*), tea (*Camellia sinensis*), banana (*Musa* spp.), avocado (*Persea americana*), fig (*Ficus casica*), guava (*Psidium guajava*), mango (*Mangifera indica*), olive (*Olea europaea*), papaya (*Carica papaya*), cashew (*Anacardium occidentale*), pistachio (*Pistacia vera*), macadamia (*Macadamia integrifolia*), almond (*Prunus amygdalus*), sugar beets (*Beta vulgaris*), oats (*Avena*), barley (*Hordeum*), vegetables, ornamentals, and conifers.

Vegetables include tomatoes (*Lycopersicon esculentum*), lettuce (e.g., *Lactuca sativa*), green beans (*Phaseolus vulgaris*), lima beans (*Phaseolus limensis*), peas (*Lathyrus* spp.) and members of the genus *Cucumis* such as cucumber (*C. sativus*), cantaloupe (*C. cantalupensis*), and musk melon (*C. melo*). Ornamentals include azalea (*Rhododendron* spp.), hydrangea (*Macrophylla hydrangea*), hibiscus (*Hibiscus rosasanensis*), roses (*Rosa* spp.), tulips (*Tulipa* spp.), daffodils (*Narcissus* spp.), petunias (*Petunia hybrida*), carnation (*Dianthus caryophyllus*), poinsettia (*Euphorbia pulcherrima*), and chrysanthemum. Conifers which may be employed in practicing the present invention include, for example, pines such as loblolly pine (*Pinus taeda*), slash pine (*Pinus elliotii*), ponderosa pine (*Pinus ponderosa*), lodgepole pine (*Pinus contotta*), and Monterey pine (*Pinus radiata*); Douglas-fir (*Pseudotsuga menziesii*); Western hemlock (*Tsuga canadensis*); Sitka spruce (*Picea glauca*); redwood (*Sequoia sempervirens*); true firs such as silver fir (*Abies amabilis*) and balsam fir (*Abies balsamea*); and cedars such as Western red cedar (*Thuja plicata*) and Alaska yellow-cedar (*Chamaecyparis nootkatensis*).

The term plant or plant material or plant part is used broadly herein to include any plant at any stage of development, or to part of a plant, including a plant cutting, a plant cell, a plant cell culture, a plant organ, a plant seed, and a plantlet. A plant cell is the structural and physiological unit of the plant, comprising a protoplast and a cell wall. A plant cell can be in the form of an isolated single cell or aggregate of cells such as a friable callus, or a cultured cell, or can be part of a higher organized unit, for example, a plant tissue, plant organ, or plant. Thus, a plant cell can be a protoplast, a gamete producing cell, or a cell or collection of cells that can regenerate into a whole plant. As such, a seed, which comprises multiple plant cells and is capable of regenerating into a whole plant, is considered a plant cell for purposes of this disclosure. A plant tissue or plant organ can be a seed, protoplast, callus, or any other groups of plant cells that is organized into a structural or functional unit. Particularly useful parts of a plant include harvestable parts. A harvestable part of a plant can be any useful part of a plant, for example, flowers, pollen, seedlings, tubers, leaves, stems, fruit, seeds, roots, and the like.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Further, given solid and liquid handling procedures used in the real world, there is certain inadvertent error and variation that is likely through differences in the manufacture, source, or purity of the ingredients used to make the compositions or carry out the methods and the like. Whether or not modified by the term "about", the claims include equivalents to the quantities.

The following is presented by way of illustration and is not intended to limit the scope of the invention. All references cited herein are incorporated herein by reference.

Examples

In FIG. 1 is illustrated a sample array type zeolite bed that has been shown to be more efficient compared to conventional methods in which zeolites are crowded together. As can be seen in FIG. 1, the zeolites are patterned such that they do not touch each other or are arranged such that a portion of the particle may touch another, but at least some portion of the zeolite has space between it and another zeolite. They may be arranged in rows and columns as illustrated in the upper portion of the figure. Among the improvements shown are more efficient regeneration/drying of hydrated zeolites.

Figures 2A, 2B:
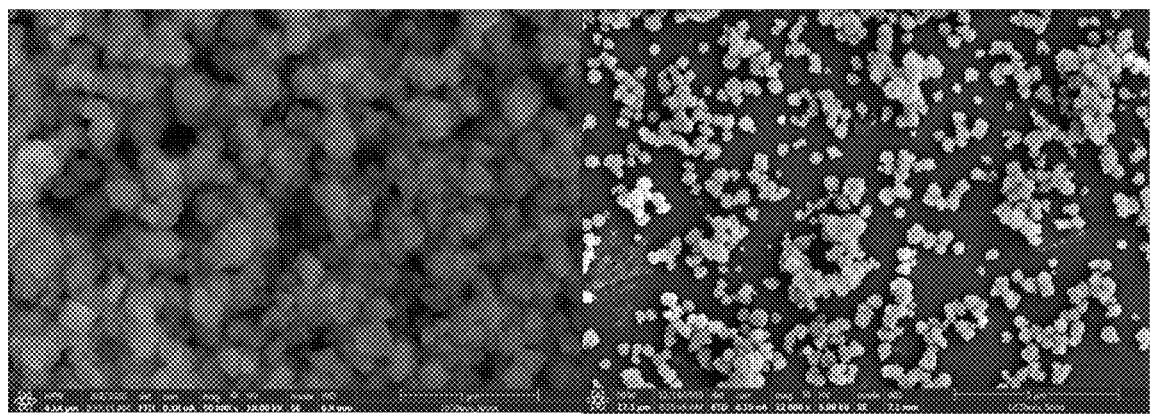
FIGS. 2A and 2B are photographs showing zeolite nanoparticles, with a closer view shown in FIG. 2A and a broader view shown in FIG. 2B.
Figure 3:
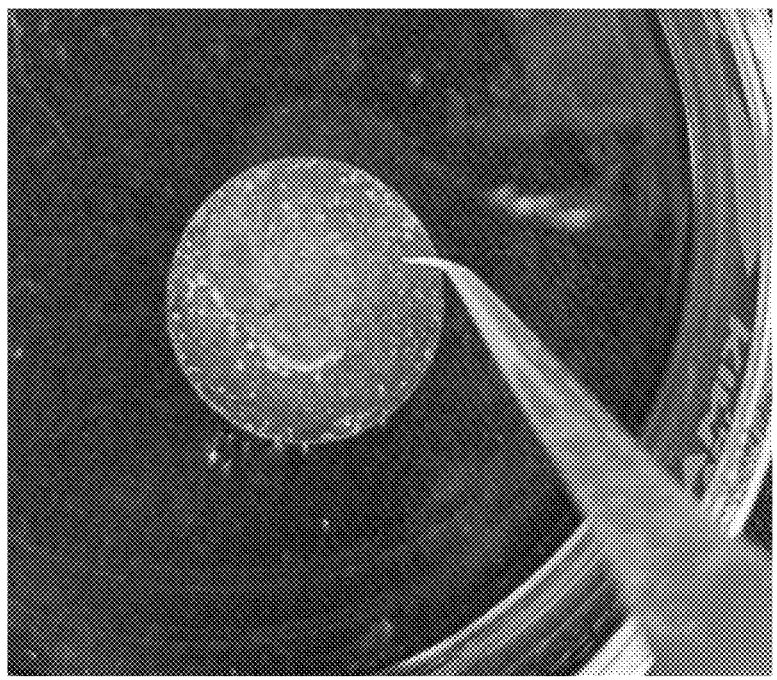
FIG. 3 is a photo of 0.1 µm NaY zeolite particles deposited onto a glass slide through covalent linking.
Figure 4:
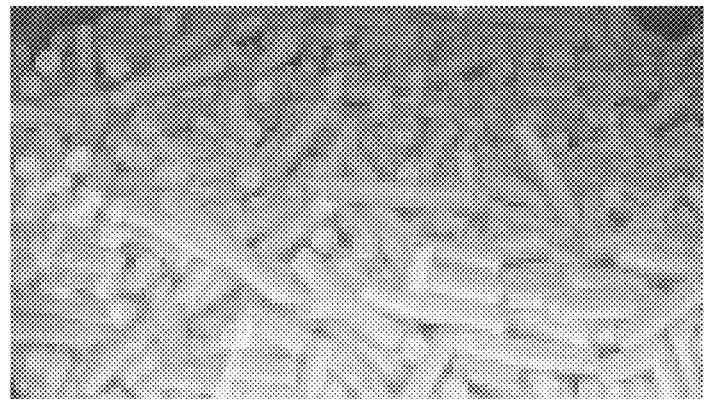
FIG. 4 is a photo of commercially available zeolite particles.

We created an instant desiccant made of zeolite particles (FIGS. 2A and B) with a closer view in the left panel and broader view in the right patent. The size of the particles here is less than 0.5 µm, but larger than 50 µm or smaller than 200 nm can be made. These were coated on glass slides (FIG. 3) but can also be coated on porous glass [fiber] supports. We term the new materials instant desiccants, which can be used in dehydration of commodities through quickly and near instantly removal of moisture in the air at near room temperatures (e.g., lower than 45 degrees Celsius). Hydrated instant desiccants can be efficiently and economically dried using microwave radiation for short periods of time (in one example, less than 30 seconds). In our tests, we used commercially available, millimeter-sized NaY zeolite particles (FIG. 4) in the microwave and hot air drying tests and observed a greater than 10-fold energy saving for 5-min drying periods when compared to hot air drying.

In one example of zeolite synthesis, sodium silicate ($Na_2O$, ~10.6%, $SiO_2$, ~26.5%) was used as the silica source and cooled to 10° C. Then sodium aluminate ($Al(Al_2O_3)$: 50-56%, Na (as $Na_2O$): 37-45%) followed by NaOH dissolved in the water were added to the solution. The chemical composition of this hydrogel was prepared in the molar ratio of $15SiO_2:1Al_2O_3:15Na_2O: 320H_2O$. The mixture was stirred and stand under room temperature for 24 h. 7.2 g sodium aluminate and 12.0 g water wax mixed and stirred until fully dissolved. 70.0 g sodium silicate was mixed with 65.0 g water, followed by 15.5 g structure directing agent prepared before. The content was stirred until mixing uniformly. Transfer the hydrogel to autoclave and heat in the oven under 100° C. for 24 h. The particle was collected by filtration after hydrothermal synthesis.

In an embodiment a device may be employed using the microwave heating device which was compared with the hot air device which has a heating element and is thermally insulated. The electrical power delivered into the microwave device is measured, which overestimate the microwave power absorbed by the sample. An embodiment provides the container is a glass container having holes in the bottom to allow air flow, which can be drilled using lasers. A scale is likewise provided to monitor the dehydration process in real time.

Figure 5:
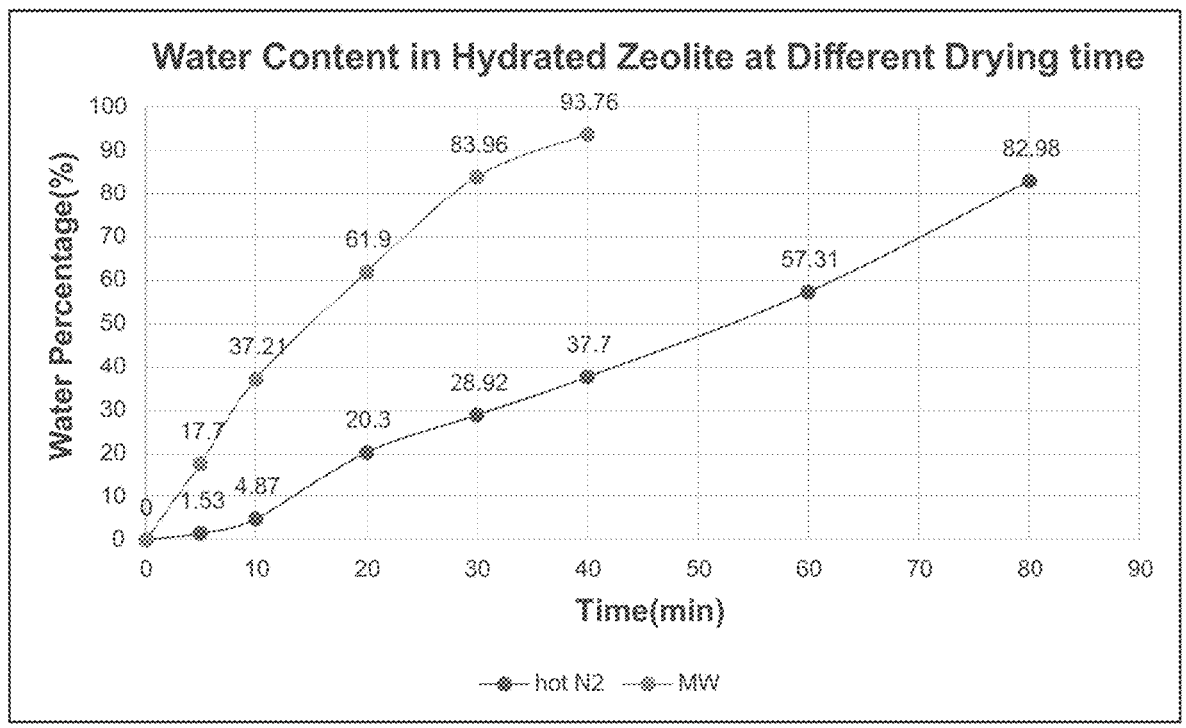
FIG. 5 is a graph showing a comparison of dehydration using hot air (lower curve) versus microwave radiation (upper curve).

FIG. 5 summarizes the results. Energy savings for longer drying periods are less, and at 40 min heating, the energy saving was approximately 60%. For both hot air and microwave drying, about 130 g of fully hydrated NaY pellet sample was placed in the customized flask with laser drilled 2 mm diameter holes at the bottom controlled by a self-designed and motorized rotation system operated by a LabVIEW program. The connector on the top of the designed flask was connect to gas cylinder to supply $N_2$ gas or compressed house air, and the flow rate was controlled and measured by a flow meter. 5, 10, 20, 30, 40 minutes for both microwave and hot air drying trials were performed under 15 standard cubic feet per minute (SCFH) $N_2$ or air flow rate. Mass of the zeolite was measured using a balance immediately after each drying, and water loss was calculated according to the mass change. It shows comparison of dehydration of fully hydrated millimeter-sized zeolite particles by hot air (lower curve) and microwaves (upper curve). The hot air is achieved using an electrical heater powered by 40 VAC obtained using a transformer and power consumption is also monitored with the same sensor. Both the hot air and microwave device are powered by 250-350 W 110 V AC. For a 5-min drying, microwave heating is over 11.6-fold as efficient as hot air drying.

Figure 6:
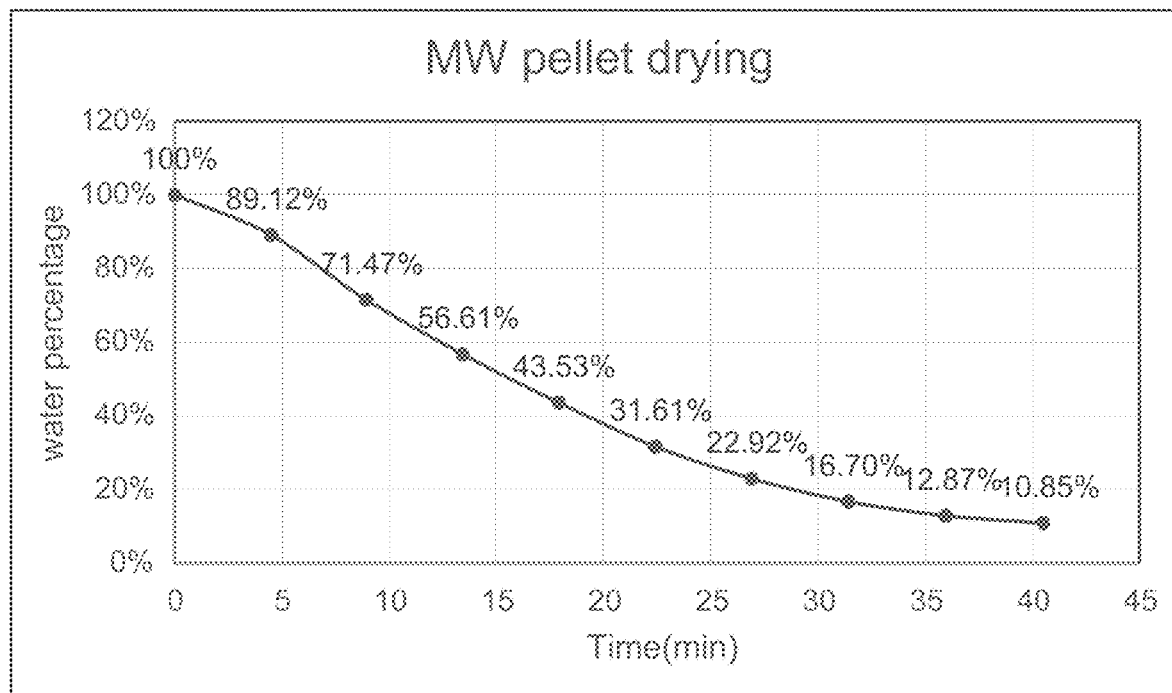
FIG. 6 is a graph showing water loss as a function of microwave heating time.

FIG. 6 shows water loss as a function of microwave heating time. Fast loss is observed at short heating times. Once passed 80% of water loss, the rate of water loss in these nearly dried zeolites is much lower than in zeolites with high water contents. When the heating times are long enough, the difference between the two decreases. At 40 min, the difference is only 2.5-fold. Factoring in the difference between the cost of natural gas and electricity, assuming solar is not used, one would need the microwave drying be 4× as efficient as hot air.

Figure 7:
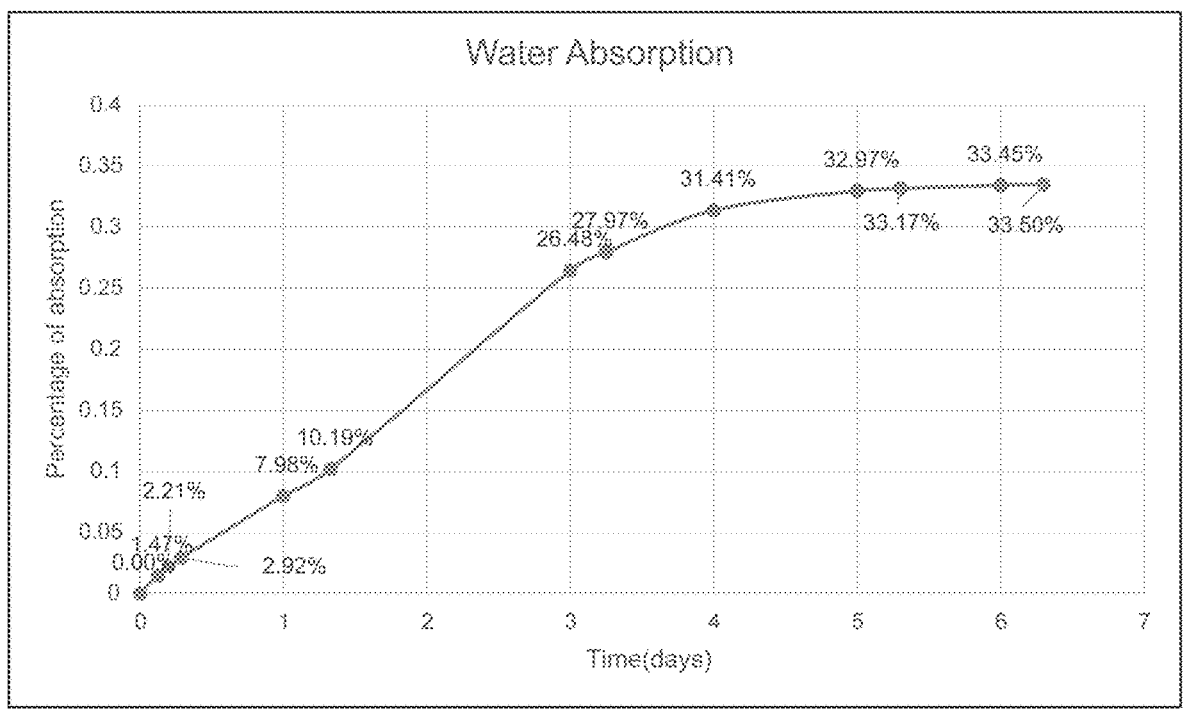
FIG. 7 is a graph showing hydration of zeolites as a function of time. The moisture content is absolute.

We found that for more efficient drying, not all the water is needed to be removed from the zeolite particle. For example, it is more economical to remove only 30% of the water after 10 min microwave drying (FIG. 7) to maintain a 7.6× energy saving over hot air drying for this sized zeolite particles.

We anticipate that in using smaller sized particles (e.g., 0.1 mm) on supports, the drying time can be shortened to 10-30 seconds and under that conditions, microwave drying may be 100-fold more energetically efficient than hot air drying.

We investigated the mechanisms of hydration and dehydration of zeolites using both experimental methods such as NMR and neutron imaging as well as theoretical methods such as quantum chemistry simulations. The results provided explanations for the conclusions mentioned above.

Figure 8:
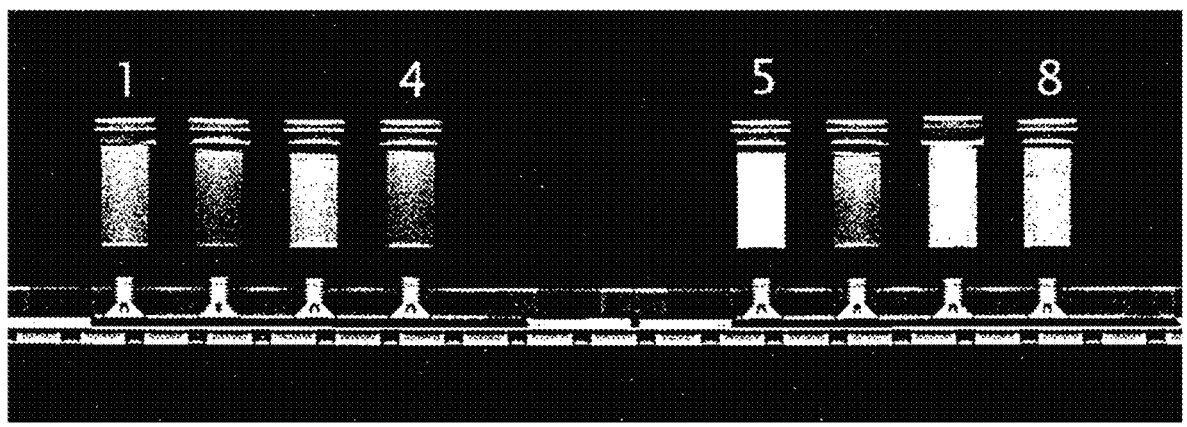
FIG. 8 shows neutron imaging of hydration of zeolites in aluminum containers.

The normally slow hydration and dehydration associated with conventional desiccants are caused by the large, millimeter-sized zeolite particles with small, nanometer-diameter pores. At mild temperatures (lower than 45 degrees Celsius but above room temperature) water molecules take a long time, on the order of hours or even days, to reach all the nanometer channels in millimeter-sized zeolites (FIG. 8). Brighter areas mean high water content in the sample. Eight samples were imaged. Sample #5 is fully hydrated. Samples #2, 4 and 6 are hydrated zeolites from fully dehydrated zeolites filled in the aluminum cylinders with Teflon caps. It takes 24-48 hours for hydration in different relative humidity environments. Samples #7 and 8 are fully hydrated samples dried at 100° C. for 20 and 40 min. Uniform water distribution is observed in these two samples, especially in #8 when the image is not saturated.

This means that it is impossible to use normal zeolites at mild (ambient) temperatures to quickly remove moisture in the air that will be used to dry commodities. At high temperatures (100 to 200 degrees Celsius), the diffusion of water in the pores/channels is much faster and dehydration at 100 or 200 degrees Celsius only takes approximately 30 minutes to 120 minutes for traditional zeolites when dried with hot air.

Figure 9:
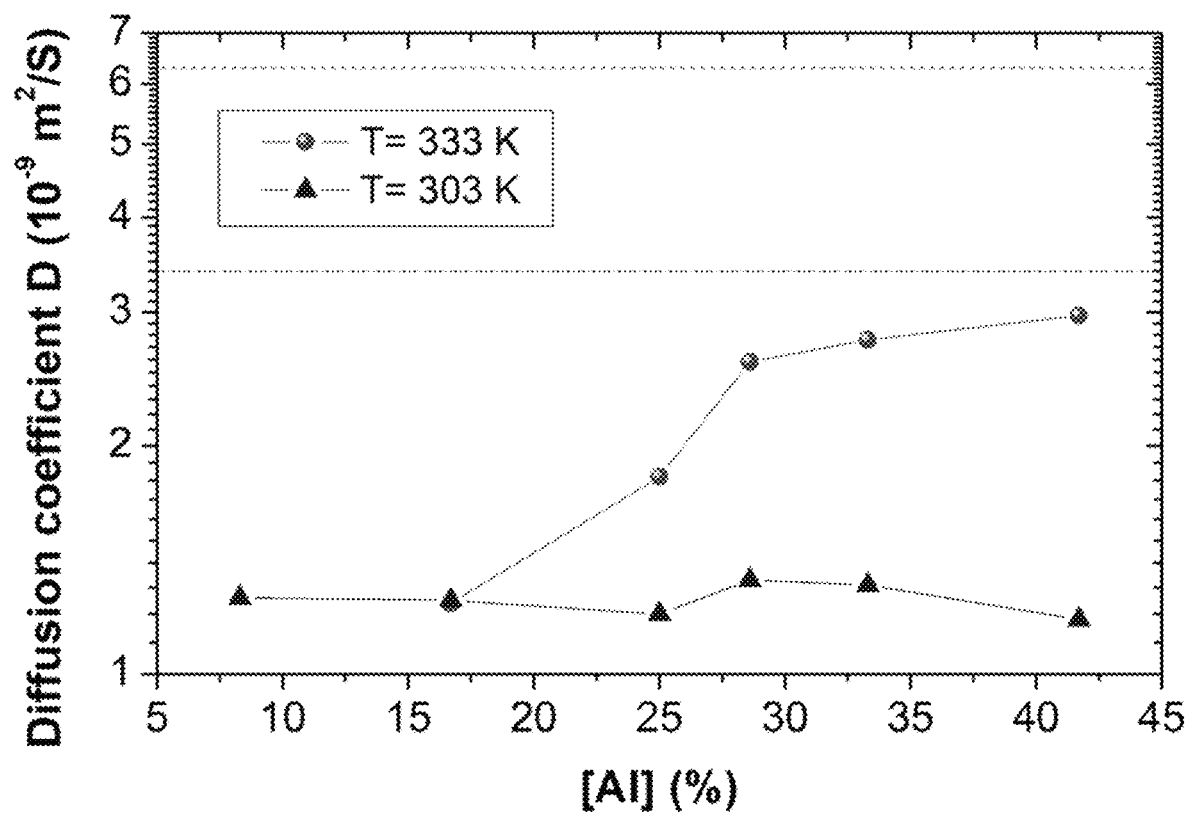
FIG. 9 is a graph showing theoretical simulation of diffusion of water in zeolite channels.
Figure 10:
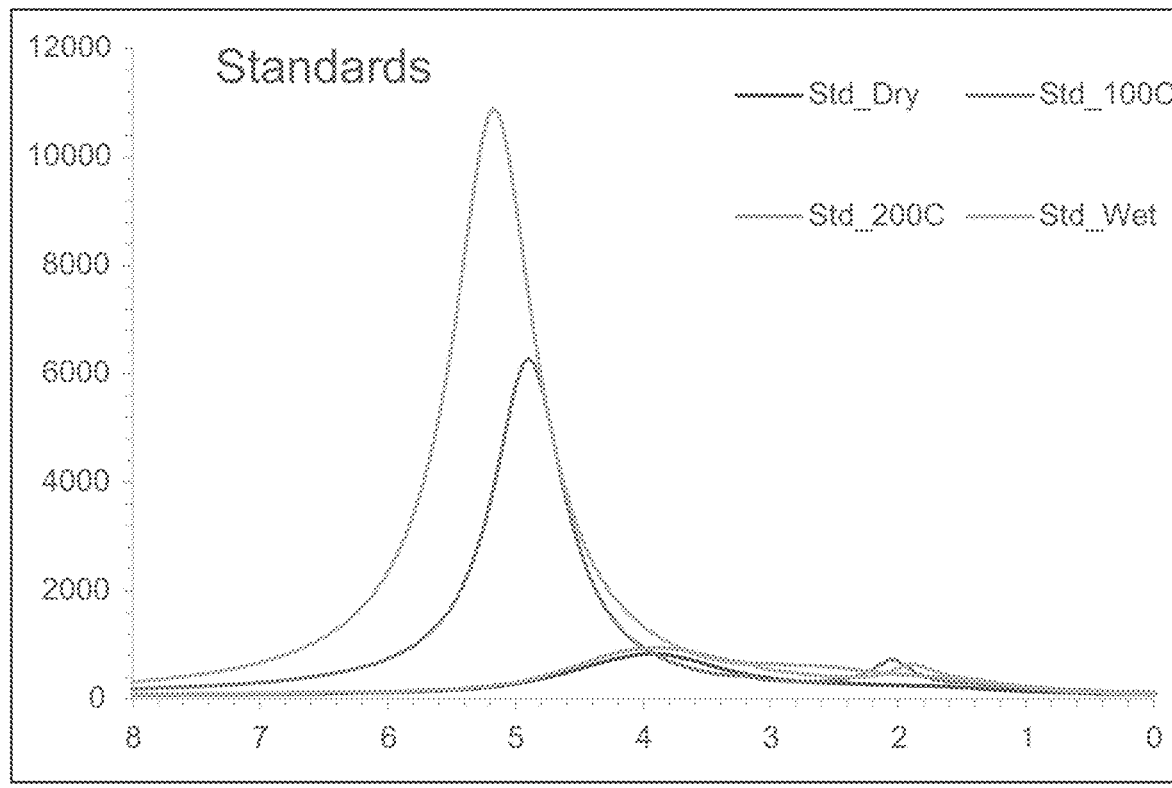
FIG. 10 is a graph showing NMR data of zeolites dehydrated by microwaves. The room temperature NMR data has a peak at 5.2 ppm. The 100-degree Celsius oven dried samples have a peak at 4.0 ppm.

This was also confirmed with neutron imaging measurements (FIG. 9). Neutron imaging was used to determine the diffusion rate of water through columns of zeolites and the results suggests that at room temperature diffusion is slow and at high temperatures (100-200 degrees Celsius) diffusion is not a limiting factor. Theoretical simulation reveals a similar trend (FIG. 9).

Figure 11A:
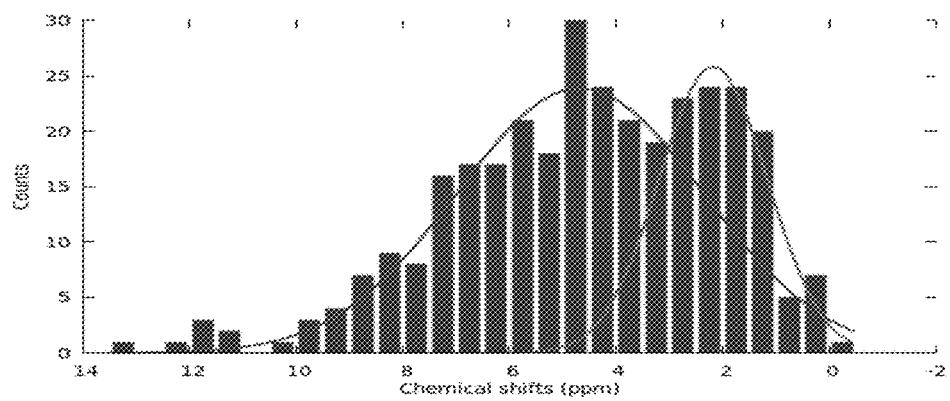
FIGS. 11A, 11B, and 11C are graphs each showing theoretical simulation of proton NMR profiles of dehydration of hydrated zeolites at low (303 K) and high (333 K) temperatures.
Figure 11B:
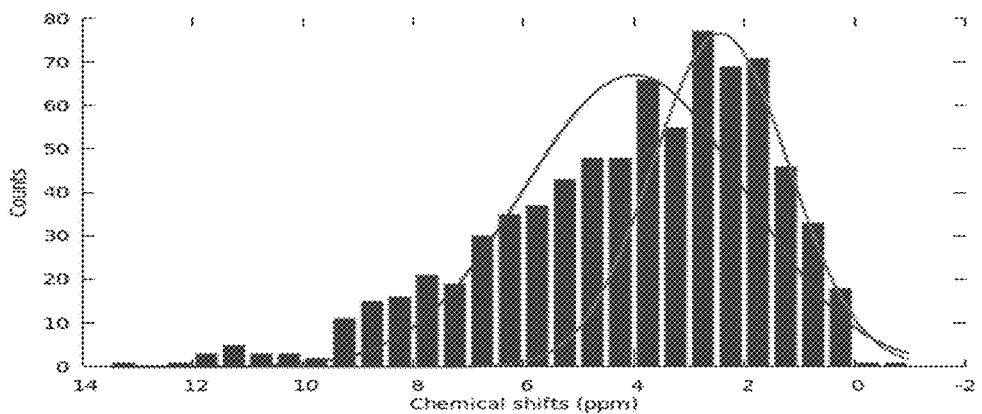
Figure 11C:
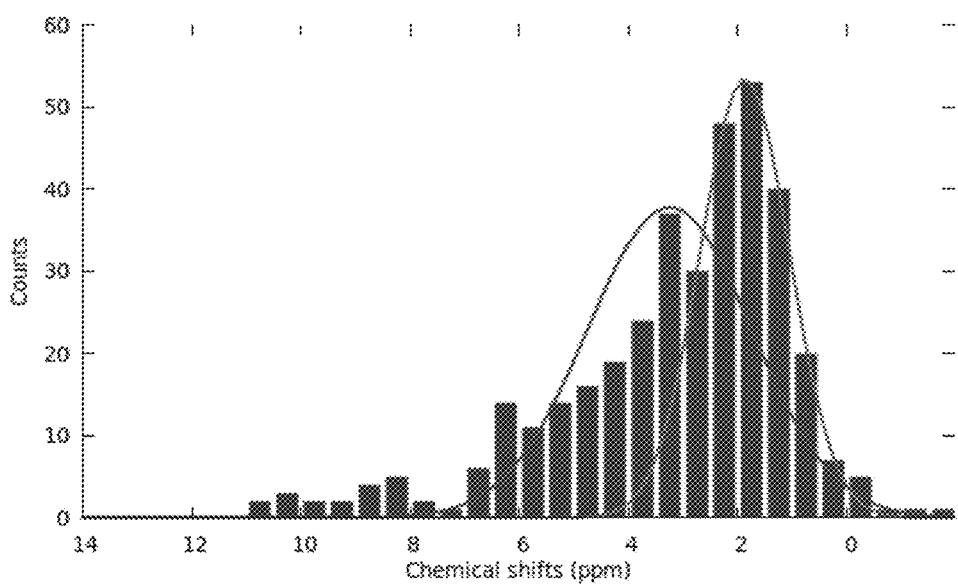
Figure 12:
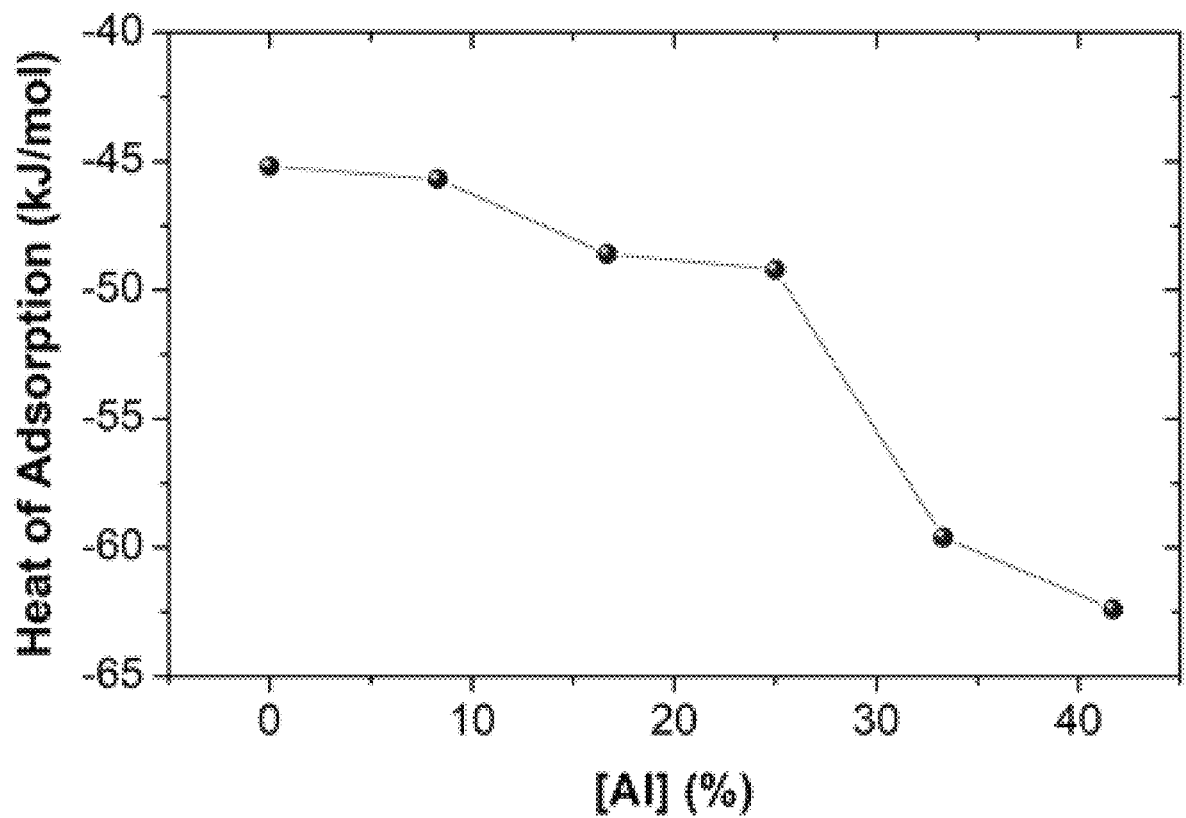
FIG. 12 is a graph showing binding energy or heat of formation of the water-zeolite system as a function of aluminum (in atomic percent).
Figure 13A:
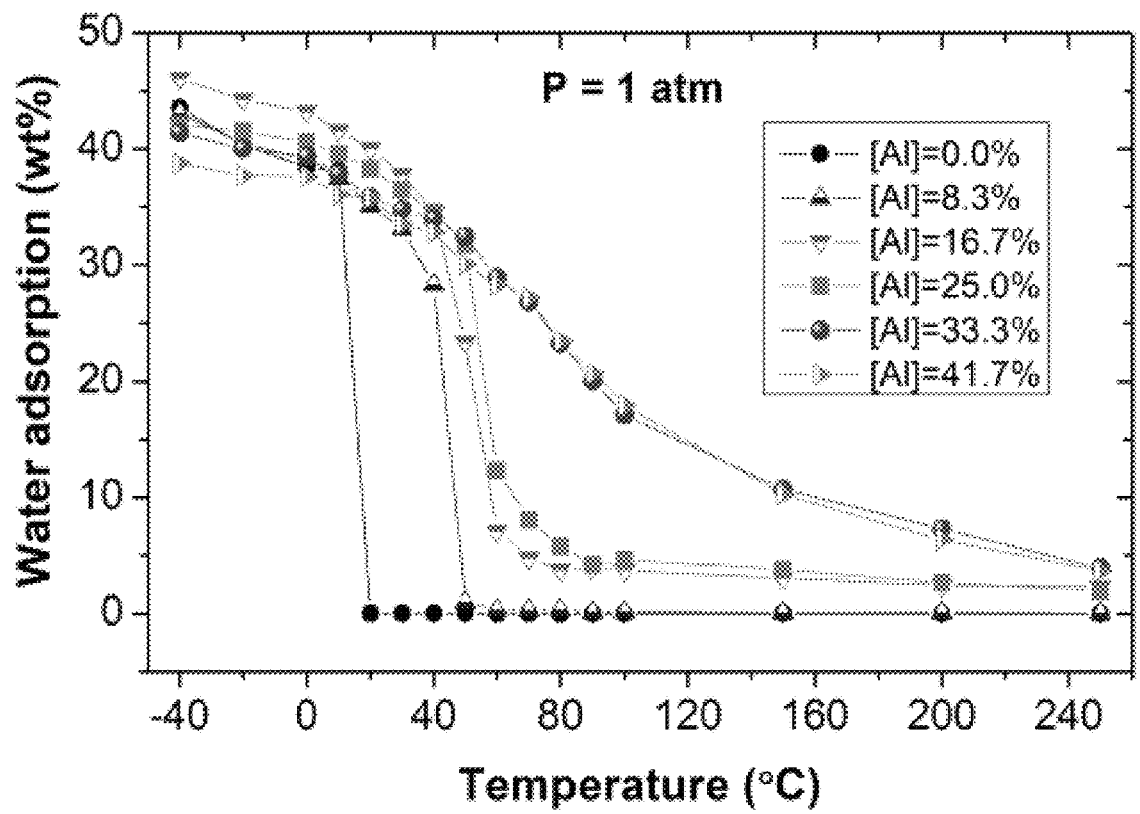
FIGS. 13A and 13B are graphs showing water adsorbed in zeolites as a function of temperature for different aluminum concentrations is shown in FIG. 13A and as a function of temperature and pressure with 33.3% aluminum in FIG. 13B.
Figure 13B:
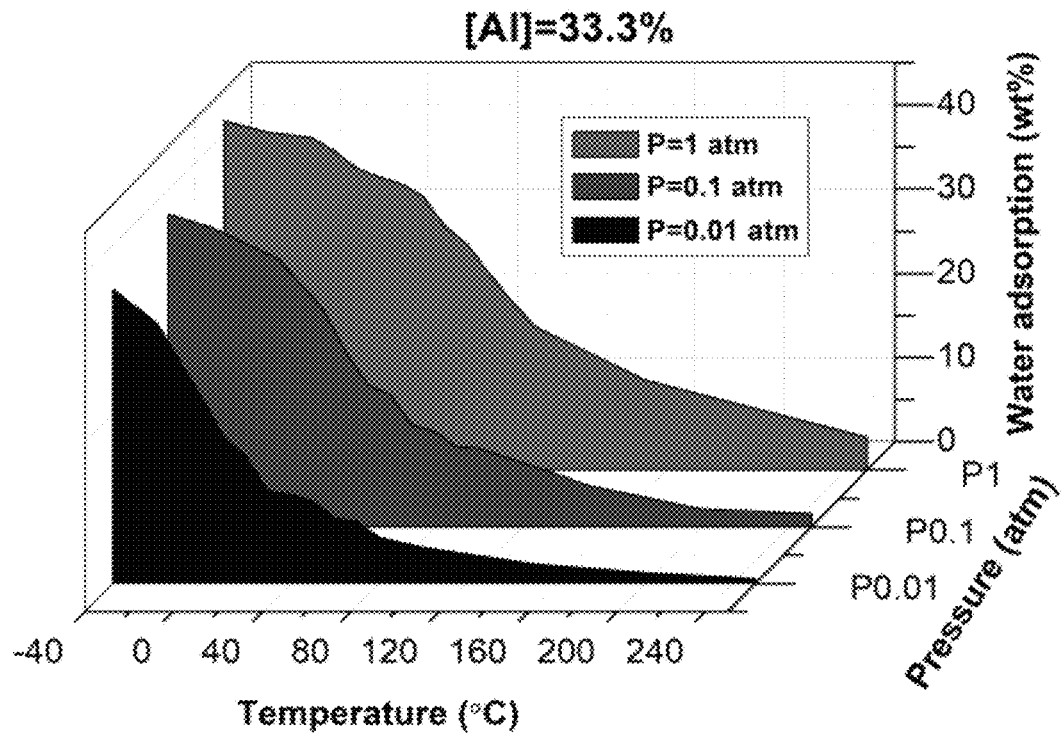

Both experimental and theoretical data (FIGS. 10 and 11A-C) suggest that nuclear magnetic resonance (NMR) data can be used to identify binding sites in zeolites that interact with water molecules and there are generally three types of sites. The weakest interactions are between water and silicon/oxygen sites or between water and oxygen next to silicon, as shown by the peak at 5 ppm (FIGS. 11A-C). The medium-strength interactions are between water and aluminum sites or between water and oxygen next to aluminum sites, as indicated by the peak at 3.5 ppm. This conclusion is corroborated by first-principles total energy calculations (FIG. 12), which show that the binding energy of water in zeolites is higher when aluminum and sodium are added. The strongest interactions are between water molecules and sodium ions in the sodalite cages, which is manifested by the peak at 2 ppm. All three types of interactions are revealed by experimental NMR measurements as well as quantum chemistry theoretical simulation. The latter was done for the first time. FIGS. 13A and 13B illustrate results obtained when aluminum is added. Water adsorbed in Faujasite (FAU) zeolites as a function of temperature for different aluminum concentrations is shown in FIG. 13A and as a function of temperature and pressure with 33.3% aluminum in FIG. 13B. These studies suggest that it is more economical to employ silicon and aluminum sites to retain water in zeolites, hence the short drying times and at lower temperatures. Energetically it is the easiest to remove water from silicon sites and the hardest to remove water from Na ions. The number of Na ions is the same as aluminum. However, aluminum is needed to strengthen the framework zeolite—otherwise the pores can be easily collapse as in porous silica case.

Figure 14A:
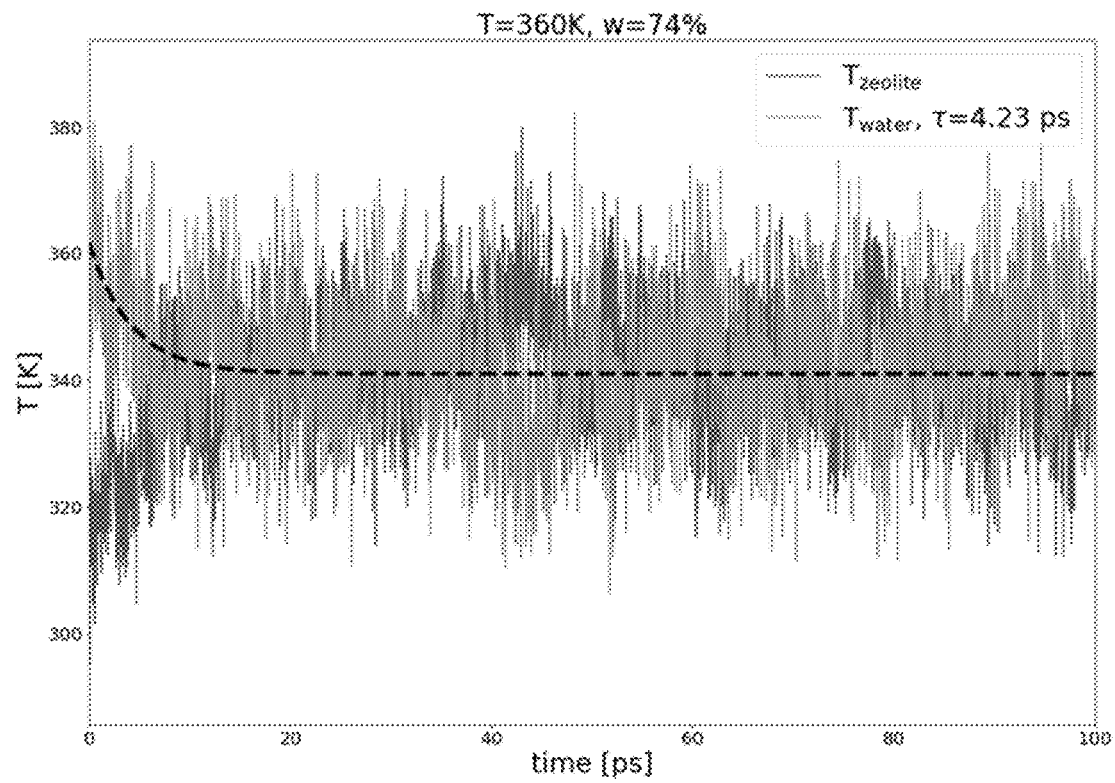
FIGS. 14A and 14B are depictions of quantum chemistry simulation of energized water in zeolites.
Figure 14B:
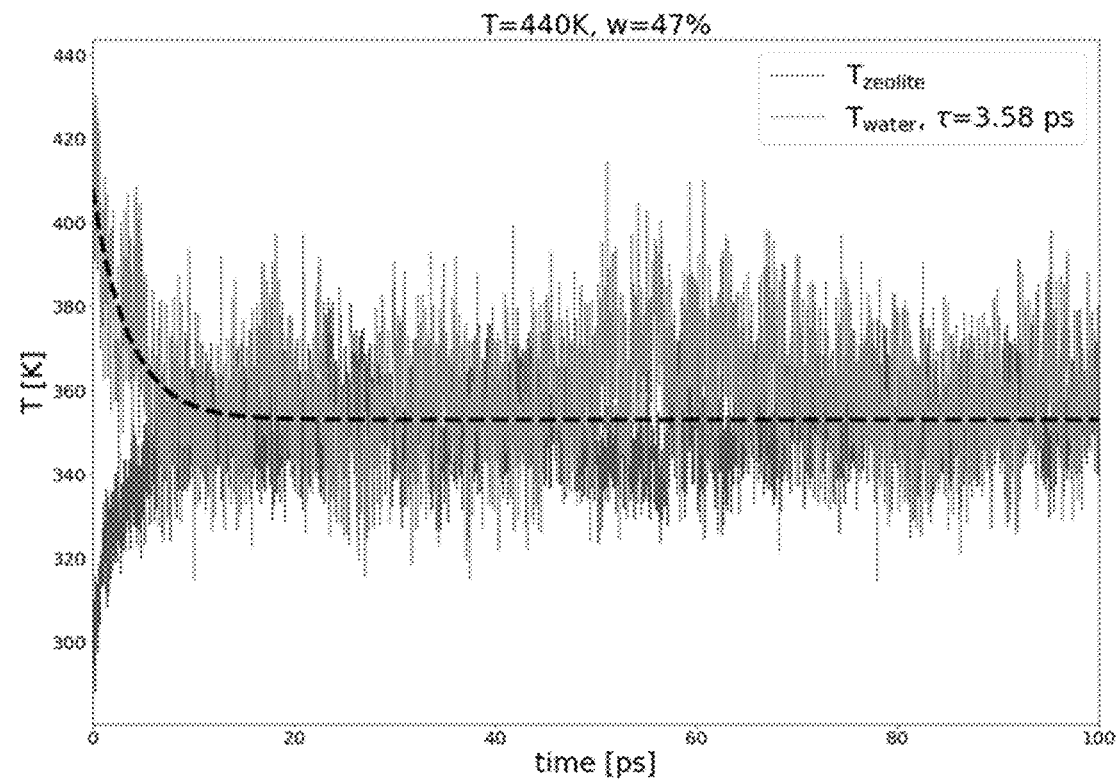

We have performed nonequilibrium molecular dynamics simulation of microwave drying of hydrated zeolites. The results (FIGS. 14A and B) show that there is an efficient energy transfer between the heated water and the zeolite substrates, which is surprisingly fast, on the order of picoseconds. Techno economic Analysis (TEA) has been performed. A techno-economic evaluation compares microwave drying of instant desiccants (MDID) to conventional drying system for drying proteins, fruits, and antibodies. The work included the development of baseline models of each system that allowed for a direct comparison on the metric of economics. The baseline models used the same system boundaries that limited this techno-economic assessment to the drying process and used harmonized model inputs when possible for consistency. The models used standard $n^{th}$ plant economic assumptions from literature and assume 10% internal rate of return (IRR), 20-year facility life, 8% loan interest rate on a 10-year loan with 40% equity, and the 2019 U.S. corporate tax rate of 21%. The above economic assumptions were combined with capital costs, operational costs, linear depreciation, and product processing rate to perform a 20-year discounted cash flow rate of return (DCFROR) for each drying system. These models use the IRR as the discount rate to determine the minimum processing cost ($/metric ton) associated with drying while providing a net present value (NPV) of zero. This minimum processing cost represents a levelized cost of drying that supports a 10% IRR over the 20-year life of the system.

Figure 15:
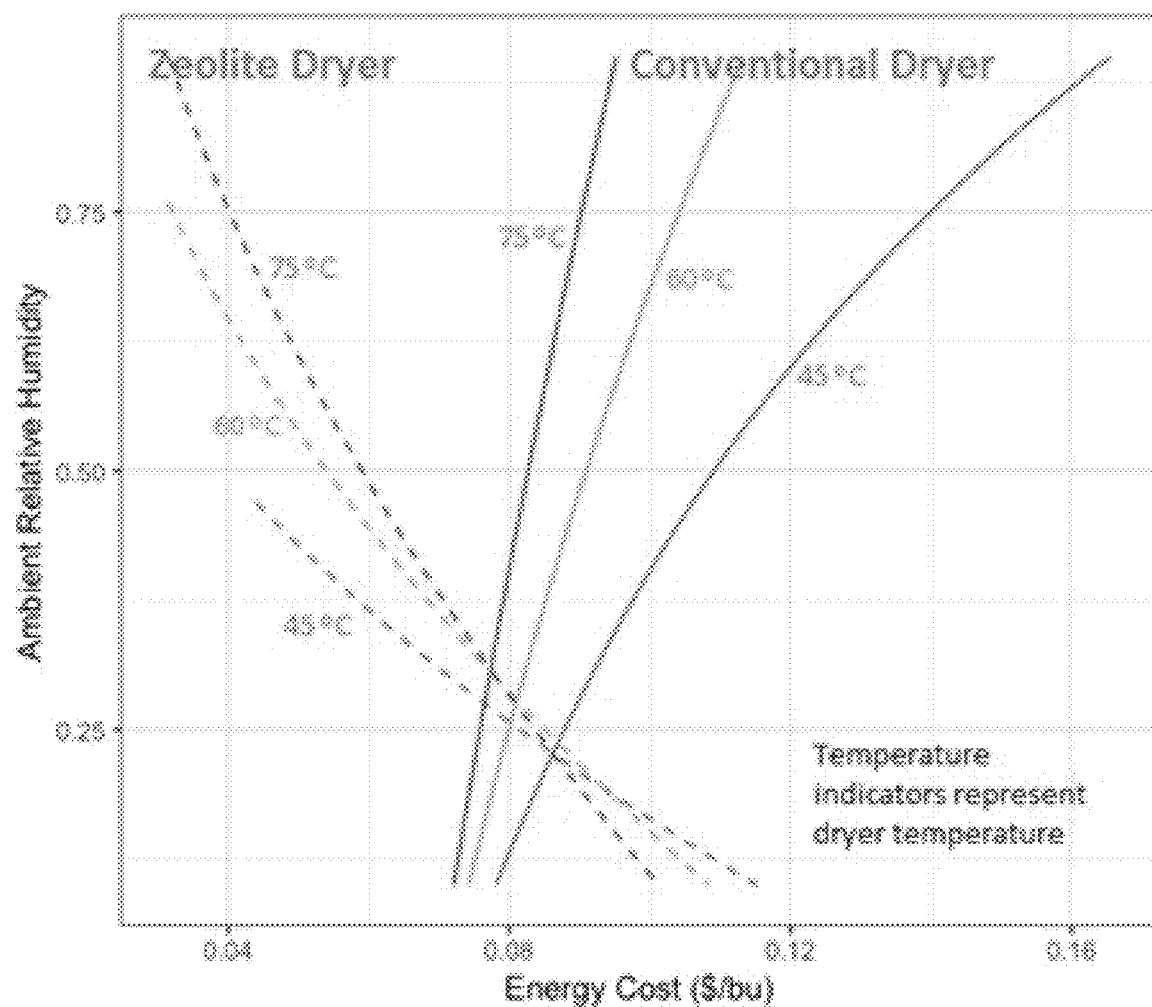
FIG. 15 is a graph showing ambient relative humidity with the zeolite dryer versus the conventional dryer.

The results FIG. 15 show that microwave drying is more economical when drying commodities of medium to low moisture content (MC).

What is claimed is:

1. A method of removing water from material or air comprising water, the method comprising,
   a) contacting said material or air with a plurality of zeolite particles comprising silicon and aluminum and having a diameter and length of less than 1 millimeter (mm), wherein said plurality of zeolite particles are arrayed on a surface in rows or columns or both;
   b) moving water from said material or air into said plurality of zeolite particles; and thereafter c) removing the water from said plurality of zeolite particles by exposing said plurality of zeolite particles to microwave radiation.

2. The method of claim 1, wherein said zeolite particles comprise about 5% (atomic) to about 45% (atomic) of aluminum.

3. The method of claim 1, wherein said material comprises plant material or said air having water moved to said plurality of zeolite particles is contacted with plant material.

4. The method of claim 1, wherein said plurality comprises zeolite particles of about 0.5 µm to 50 µm in diameter and length.

5. The method of claim 1, wherein said plurality comprises zeolite particles of about 100-400 nm in diameter and length.

6. The method of claim 1, wherein said water is moved from said material or air under ambient temperature conditions.

7. The method of claim 1, wherein said plurality of zeolite particles are arrayed on a surface such that at least a portion of said plurality of zeolite particles do not touch each other.

8. The method of claim 1, wherein said plurality of zeolite particles are exposed to said microwave radiation for about 10 seconds to about 40 minutes.

9. The method of claim 1, wherein said plurality of zeolite particles are exposed to said microwave radiation until about 30% of water is said plurality of zeolite particles is removed.

10. A method of removing moisture from a composition, said method comprising:
    a) contacting said composition with a desiccant comprising zeolite particles comprising silicon and aluminum and having a diameter and length of less than 1 millimeter (mm), wherein said plurality of zeolite particles are arrayed on a surface in rows or columns or both;
    b) moving water from said composition and into said zeolite particles; and thereafter
    c) removing the water from said zeolite particles by exposing said zeolite particles to microwave radiation.

* * * * *